(12) United States Patent
Kruckemyer et al.

(10) Patent No.: US 7,437,597 B1
(45) Date of Patent: Oct. 14, 2008

(54) WRITE-BACK CACHE WITH DIFFERENT ECC CODINGS FOR CLEAN AND DIRTY LINES WITH REFETCHING OF UNCORRECTABLE CLEAN LINES

(75) Inventors: David A. Kruckemyer, Mountain View, CA (US); Kevin B. Normoyle, Santa Clara, CA (US); Jack H. Choquette, Mountain View, CA (US)

(73) Assignee: Azul Systems, Inc., Mountain View, CA (US)

( * ) Notice: Subject to any disclaimer, the term of this patent is extended or adjusted under 35 U.S.C. 154(b) by 622 days.

(21) Appl. No.: 10/908,586

(22) Filed: May 18, 2005

(51) Int. Cl.
*G06F 11/10* (2006.01)
(52) U.S. Cl. .......................... 714/6; 714/773
(58) Field of Classification Search ................. 714/773, 714/774, 6
See application file for complete search history.

(56) References Cited

U.S. PATENT DOCUMENTS

| | | | | |
|---|---|---|---|---|
| 5,233,616 A * | 8/1993 | Callander | .................... | 714/758 |
| 5,963,718 A | 10/1999 | Muramatsu | .................. | 714/54 |
| 6,014,756 A * | 1/2000 | Dottling et al. | ................ | 714/15 |
| 6,195,729 B1 | 2/2001 | Arimilli et al. | ............... | 711/119 |
| 6,408,417 B1 * | 6/2002 | Moudgal et al. | ............. | 714/764 |
| 6,631,489 B2 * | 10/2003 | Quach et al. | ................. | 714/746 |
| 2002/0144061 A1 | 10/2002 | Faanes et al. | ................ | 711/126 |
| 2005/0022065 A1 | 1/2005 | Dixon et al. | ................... | 714/42 |

* cited by examiner

*Primary Examiner*—Stephen M. Baker
(74) *Attorney, Agent, or Firm*—g Patent LLC; Stuart T. Auvinen

(57) ABSTRACT

A write-back cache has error-correction code (ECC) fields storing ECC bits for cache lines. Clean cache lines are re-fetched from memory when an ECC error is detected. Dirty cache lines are corrected using the ECC bits or signal an uncorrectable error. The type of ECC code stored is different for clean and dirty lines. Clean lines use an error-detection code that can detect longer multi-bit errors than the error correction code used by dirty lines. Dirty lines use a correction code that can correct a bit error in the dirty line, while the detection code for clean lines may not be able to correct any errors. Dirty lines' ECC is optimized for correction while clean lines' ECC is optimized for detection. A single-error-correction, double-error-detection (SECDED) code may be used for dirty lines while a triple-error-detection code is used for clean lines.

16 Claims, 9 Drawing Sheets

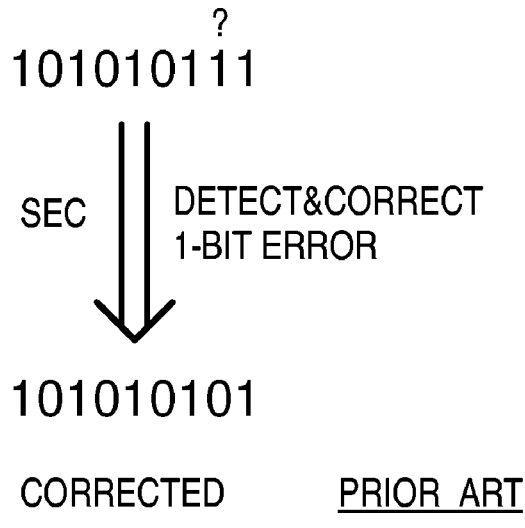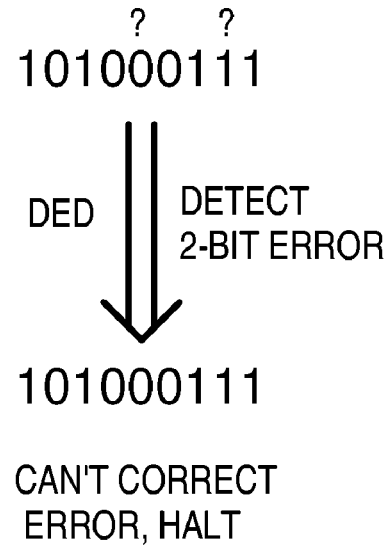
FIG. 1A　　　　　FIG. 1B
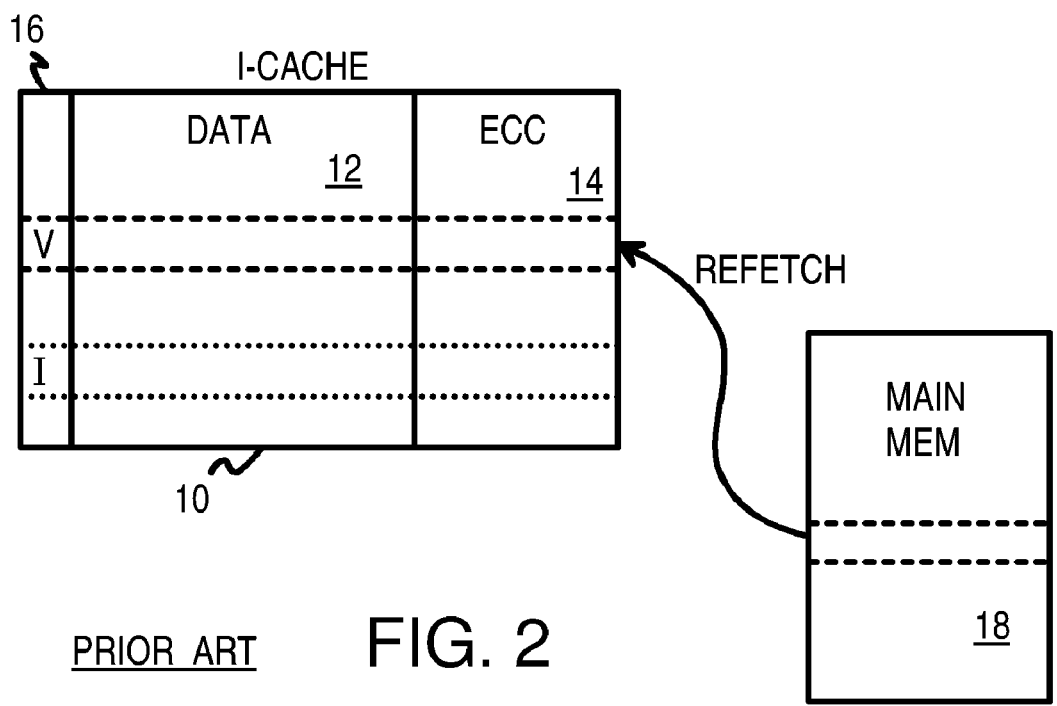
PRIOR ART　　FIG. 2

50

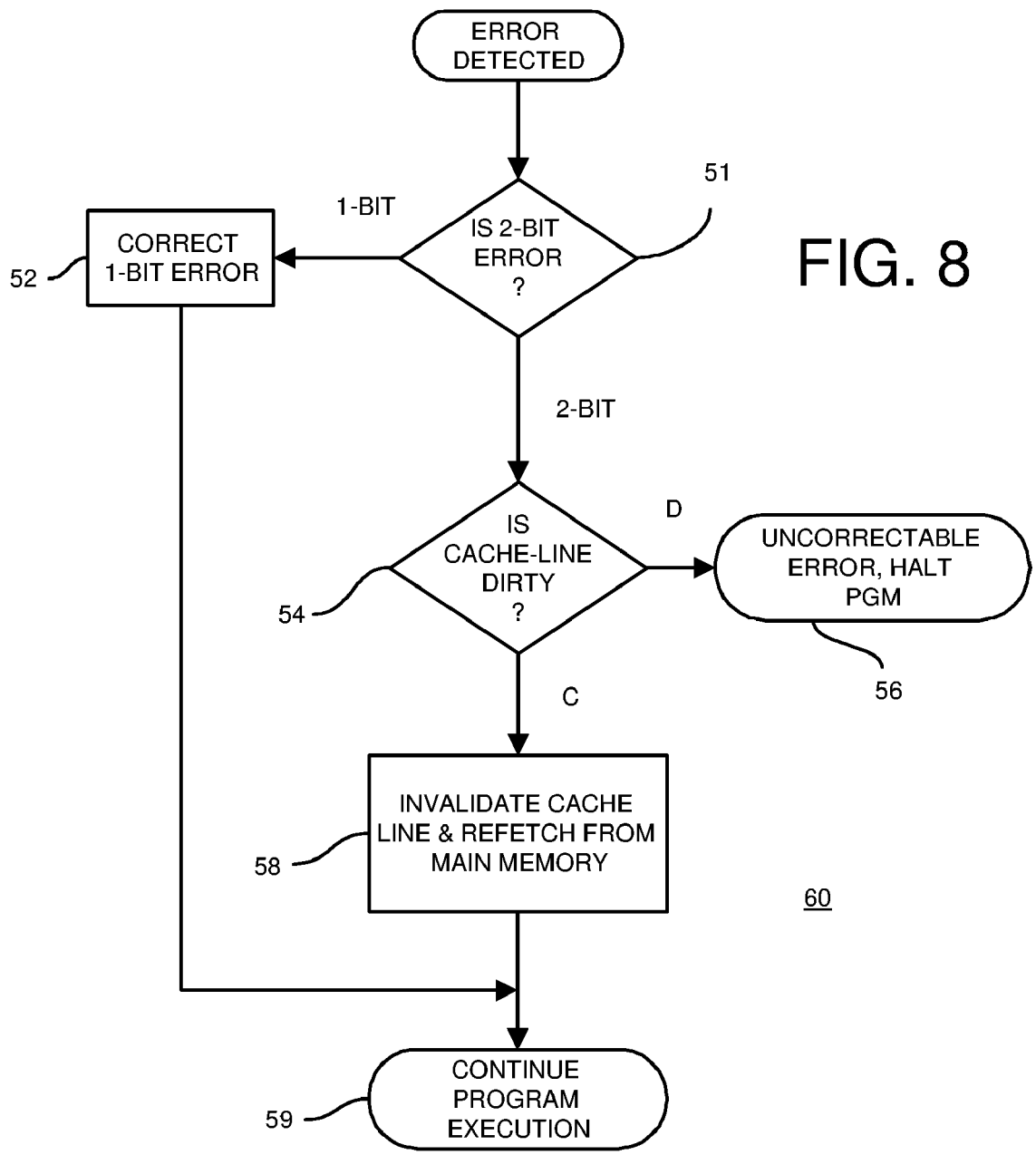

|  | CLEAN LINE | DIRTY LINE |
|---|---|---|
| UN-CORRECTABLE (2-BIT) ERROR | FAIL & HALT | FAIL & HALT |
| CORRECTABLE (1-BIT) ERROR | OK | OK |
| NO ERROR | OK | OK |

FIG. 9A

PRIOR ART

|  | CLEAN LINE | DIRTY LINE |
|---|---|---|
| UN-CORRECTABLE (2-BIT) ERROR | REFETCH & OK | FAIL & HALT |
| CORRECTABLE (1-BIT) ERROR | REFETCH & OK | OK |
| NO ERROR | OK | OK |

FIG. 9B

WRITE-BACK CACHE WITH DIFFERENT ECC CODINGS FOR CLEAN AND DIRTY LINES WITH REFETCHING OF UNCORRECTABLE CLEAN LINES

FIELD OF THE INVENTION

This invention relates to caches with error-correction code (ECC), and more particularly to ECC for write-back caches.

BACKGROUND OF THE INVENTION

Error correction is often used for main memory systems using dynamic-random-access memory (DRAM) chips. More recently, error correction is also being applied to cache memories that use static random-access memory (SRAM) or DRAM chips. The larger amounts of data processed by today's higher-performance systems requires a lower error rate than older systems; otherwise system crashes would occur more and more frequently for higher-speed systems.

An error-correction code (ECC) is often stored with a data word in the memory or cache line. For example, 8 bits of ECC may be stored with every 64-bit data word, for a total of 72 bits per word. A wide variety of codes for ECC are known and published in the technical and academic literature.

FIGS. 1A-B show error detection and correction using a SECDED code. A popular class of ECC code is known as single-error-correction, double-error-detection (SECDED). SECDED has the ability to correct a 1-bit error anywhere within the data word, and to detect a longer 2-bit error.

In FIG. 1A, a single-bit error occurs in the data word, at the location indicated by the question mark. Using an ECC field encoded as a SECDED code, an error correction unit can correct the single-bit error. The corrected data may be used in a system such as a processor.

In FIG. 1B, a double-bit error is detected. The two error bits are shown by the "?". This error exceeds the maximum number of correctable bits (1), but the error still can be detected by the SECDED code. Although the exact location of the error within the data word is not known, detecting the error is still useful since actions can be taken to recover from the detected error. For example, a computer system may be halted before data is over-written with faulty data that could be caused by using this faulty data word. Some computer systems may be able to isolate the program or routine that requested the faulty data word, and this program or routine may be halted while other programs continue running.

FIG. 2 shows an instruction cache with ECC. ECC is also being used to detect errors in cache memories. Instruction cache 10 has data field 12 and ECC field 14 that contain data and associated ECC bits for cache lines. Valid bits 16 are set when valid data is written into a cache line of instruction cache 10, and cleared when a cache line is invalidated, such as during initialization or due to snooping.

When an error is detected in a cache line, ECC fields 14 may be used to try to correct the error, as shown for FIG. 1A. Alternately, when an error is detected, the cache line may be invalidated, or the cache data may be refetched from main memory 18. Since instruction cache 10 contains only instructions, the processor never writes to instruction cache 10. Thus a back-up of all data in cache 10 is available in main memory 18.

The ECC code used may be adjusted to trade off correction and detection capabilities. For example, rather than use a SECDED code that corrects 1-bit errors and detects 2-bit errors, an ECC code that detects 3-bit errors but cannot correct any errors may be used. This is especially useful for radiation-induced soft errors that can alter several adjacent memory cells at the same time. As memory densities increase, the number of bits altered by a single radiation event can increase.

While ECC is useful with instruction caches, write-back caches are more problematic. Write-back caches may contain data that is written by the processor. A copy of the data in the cache line may not yet be available in the main memory when the processor writes directly to the cache and not directly to main memory. While using a 3-bit detect, 0-bit correct ECC code could be useful for an instruction cache, a write-back cache could benefit more from a correcting code, such as a 2-bit detect, 1-bit correct code such as SECDED.

What is desired is a cache system that includes ECC for error correction and detection. ECC for use with a write-back cache is desirable.

BRIEF DESCRIPTION OF THE DRAWINGS

FIGS. 1A-B show error detection and correction using a SECDED code.

FIG. 2 shows an instruction cache with ECC.

FIG. 8 is a flowchart of error processing for clean and dirty lines with a same error coding.

FIGS. 9A-B shows results of errors on clean and dirty lines.

DETAILED DESCRIPTION

The present invention relates to an improvement in cache error detection and correction. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that a write-back cache could use two different kinds of ECC codes: clean lines could use a non-correcting code, such as a 3-bit-detect, 0-bit-correct code, while dirty lines could use a correcting code, such as a 2-bit-detect, 1-bit-correct code. Thus clean lines that have a back-up in main memory could have improved error detection, while dirty lines that have no back-up copy use a correcting code with less detection capability.

Two separate code optimizations may be used simultaneously in the same cache. Clean lines that can be corrected by re-fetching a copy from main memory can be optimized for error detection with little or no error correction capability in the code, while dirty lines that are the only copy of that modified data are optimized for error correction, since correcting errors in the unique data copies of dirty lines may be critical for system operation.

Figure 3:
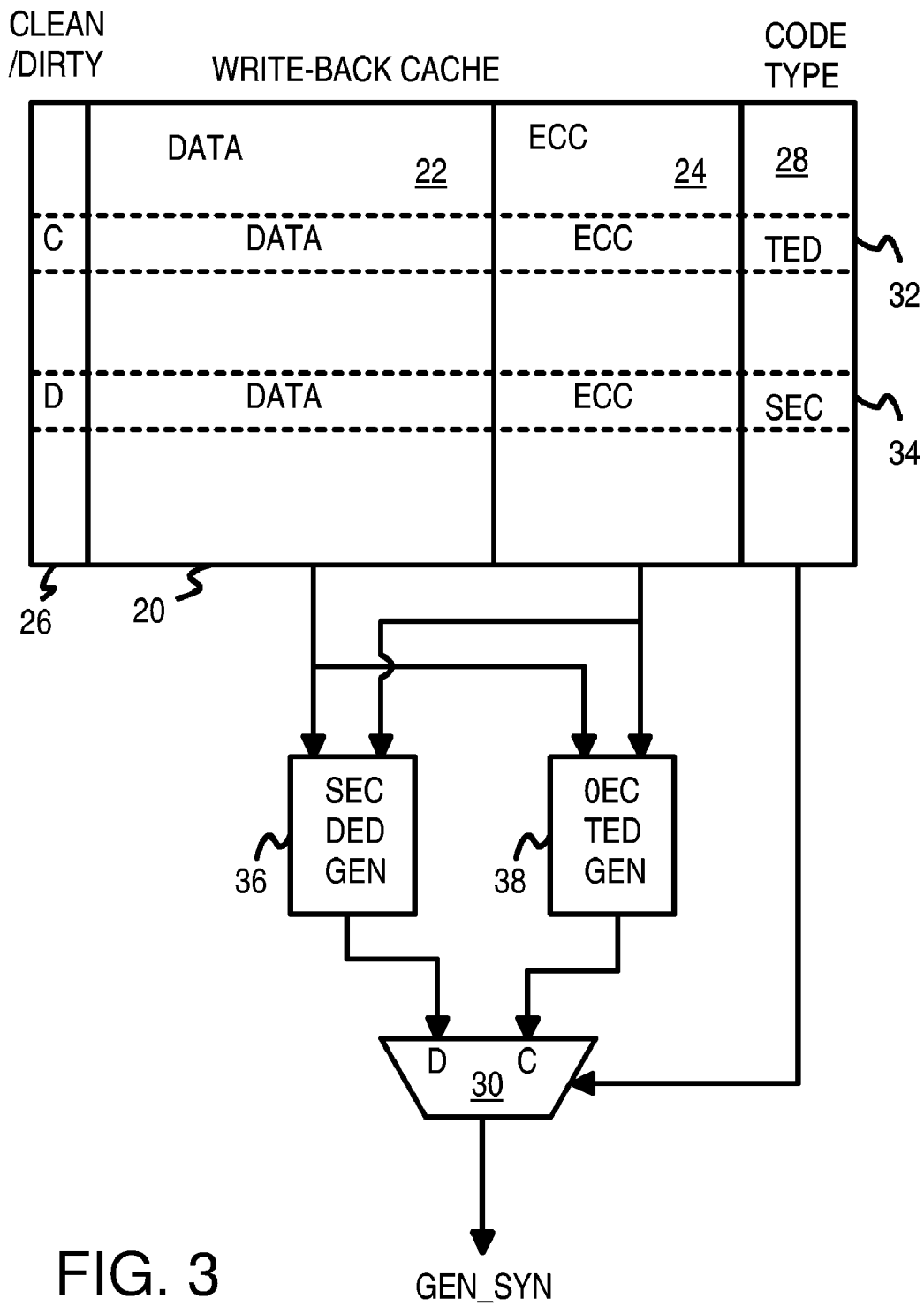
FIG. 3 shows a write-back cache that stores different ECC codes for dirty and clean lines.

FIG. 3 shows a write-back cache that stores different ECC codes for dirty and clean lines. Write-back cache 20 stores clean lines that have a back-up copy in main memory or in a higher-level cache. Clean lines either have never been written by the processor, or may have been written by the processor but have since been copied back to the main memory.

Dirty lines have been written or modified by the processor, and typically the only copy of these modifications is in write-back cache 20. Data field 22 contains the data read and written by the processor's pipeline or execution core, and may be one or more words in length, such as four 64-bit words. Dirty bit field 26 contains a dirty or modified bit for each cache line, such as a 1 for dirty and a 0 for clean. For example cache line 32 is a clean line and has dirty bit field 26 indicate clean (such as C=0), while cache line 34 is a dirty line and has dirty bit field 26 indicate dirty (such as D=1).

ECC field 24 contains the error detection and/or correction code for cache lines. For a 64-bit data field 22, ECC field 24 could contain 8 bits. The error-correction bits in ECC field 24 are normally removed from data bits in ECC field 24 before being input to a processor.

Rather than use the same ECC coding for all cache lines, ECC field 24 contains two different ECC codings. Code type field 28 indicates which coding type is used for each cache line. For example, clean cache line 32 has code type field 28 indicate a triple-error-detect (TED) code and stores in ECC field 24 an error-detect code that can detect 3-bit errors but cannot correct any errors. Dirty cache line 34 has code type field 28 indicate a single-error correct (SEC) code and stores in ECC field 24 an error-correct code that can correct 1-bit errors. This SEC code could be a SECDED code that can also detect 2-bit errors.

When clean cache line 32 is read from write-back cache 20, data from data field 22 and the error-detect code from ECC field 24 are read and input to TED syndrome generator 38. TED syndrome generator 38 combines the data and ECC bits to generate a syndrome, which may be created by a linear block code that takes the data and ECC bits as inputs for generating different bits in the syndrome. The algorithm used by TED syndrome generator 38 is for an error-detect code that can detect 3-bit errors but cannot correct errors, a OEC/TED code.

A code-type bit read from code type field 28 is sent from clean cache line 32 to a control input of mux 30. In response to the code-type bit, mux 30 selects its C input for output as the generated syndrome, GEN_SYN. Thus the TED syndrome is output for clean lines.

When dirty cache line 34 is read from write-back cache 20, data from data field 22 and the error-detect code from ECC field 24 are read and input to SEC syndrome generator 36. SEC syndrome generator 36 combines the data and ECC bits to generate a syndrome. However, the algorithm used is different than for TED syndrome generator 38. The algorithm used by SEC syndrome generator 38 is for an error-correcting and detecting code that can detect only 2-bit errors but can correct errors such as 1-bit errors, a SECDED code.

A code-type bit read from code type field 28 is sent from dirty cache line 34 to a control input of mux 30. In response to the code-type bit, mux 30 selects its D input for output as the generated syndrome, GEN_SYN. Thus the SEC syndrome is output for dirty lines.

When the syndrome is zero, no error was detected. Non-zero syndrome values may indicate some kind of error. The exact syndrome value may indicate the kind of error, such as 1-bit, 2 adjacent bits, 2 non-adjacent bits, or 3 adjacent bits. The syndrome value could also indicate the location of the error, such as which data byte contains the error. For error correcting codes, the syndrome value may be used by the error correction unit to correct the error, such as by using the location of the error to locate which data bit to flip, or by applying further calculations to locate and fix errors, or to signal an uncorrectable error.

Thus two different codes are stored in ECC field 24: a TED code for clean lines, and a SECDED code for dirty lines.

Figure 4:
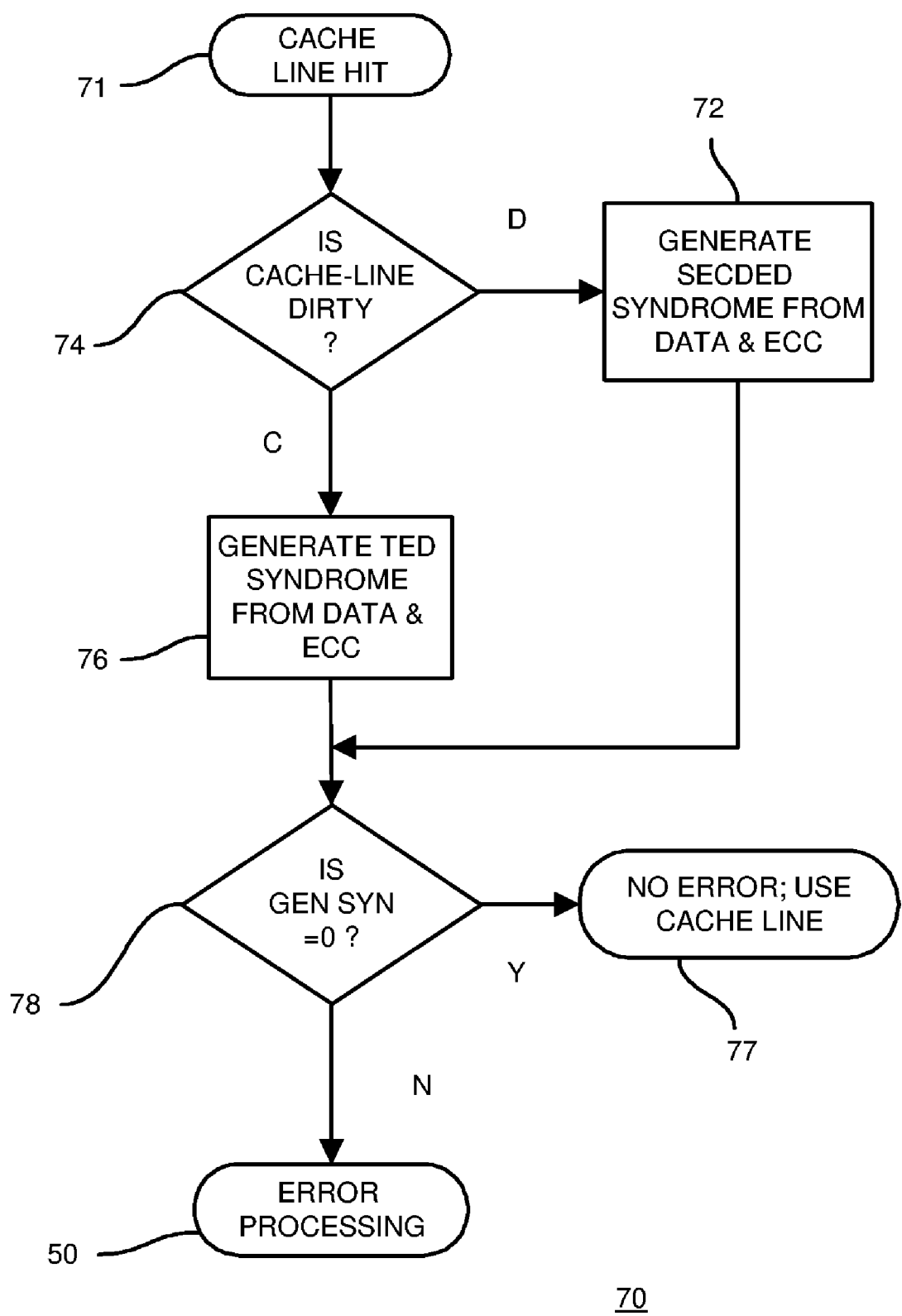
FIG. 4 is a flowchart of error checking for cache-line hits in a write-back cache with two different ECC encodings.

FIG. 4 is a flowchart of error checking for cache-line hits in a write-back cache with two different ECC encodings. Cache hit process 70 is called when a read or write to the cache hits (matches) the tag address and the cache line, or sub-line, is valid. When cache hit 71 is detected, the dirty bit is read, step 74, or decoded from cache-line state bits.

When the line is dirty, step 74, then the data and ECC fields from that cache line are input to a syndrome generator that uses an algorithm for a SECDED code, step 72, to generate the syndrome. When the line is clean, step 74, then the data and ECC fields from that cache line are input to a syndrome generator that uses an algorithm for a TED code, step 76, to generate the syndrome.

A syndrome value of 0 indicates that no error was detected, step 78. The cache line can be read or written or otherwise used normally, step 77, since no error is signaled. A non-zero syndrome value, step 78, signals an error in the data or ECC fields. Error processing 50 is performed, such as shown in FIG. 5.

Figure 5:
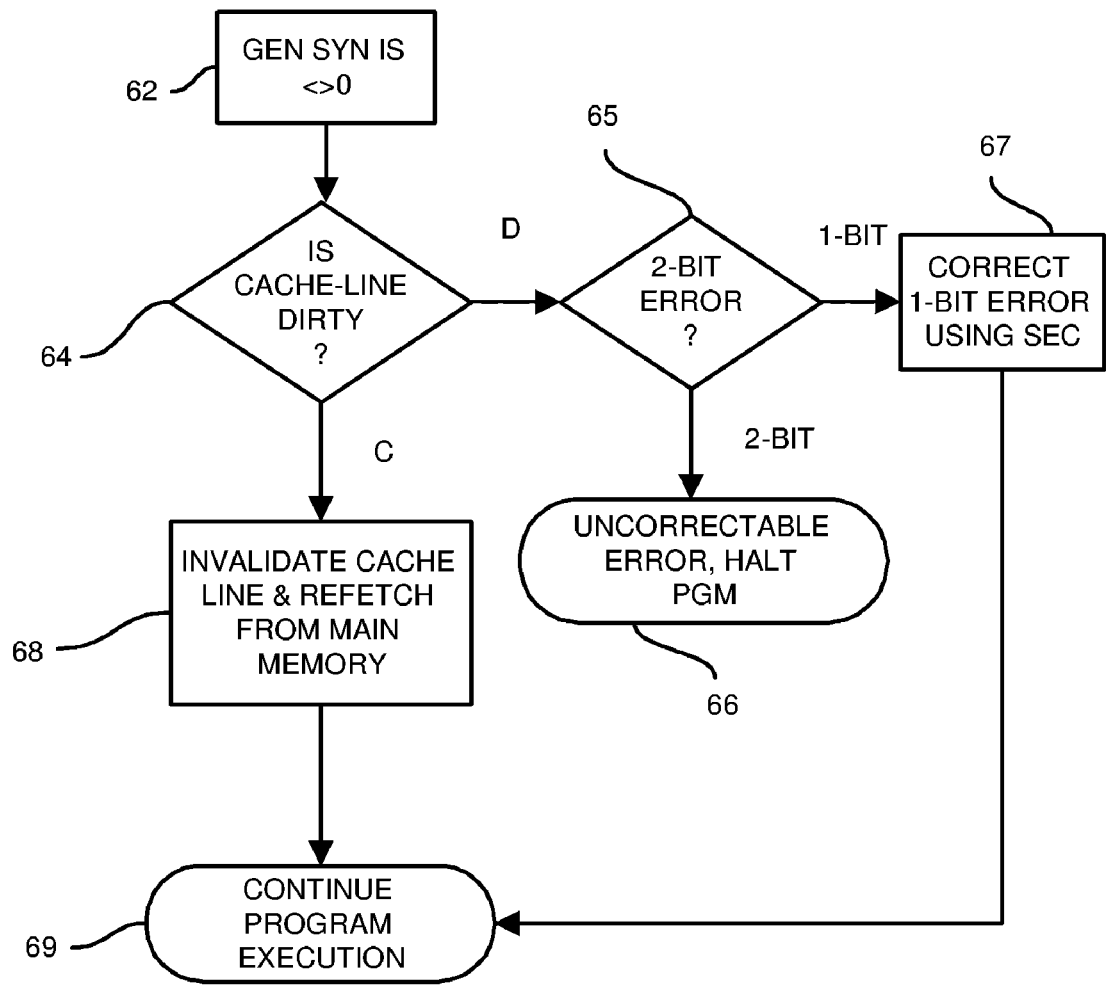
FIG. 5 is a flowchart of error processing for clean and dirty lines with different error codings.

FIG. 5 is a flowchart of error processing for clean and dirty lines with different error codings. When an error is detected by a non-zero syndrome generated from the data and ECC code, step 62, error processing 50 is activated. When the non-zero syndrome is for a dirty line, step 64, and the error is a 1-bit error, step 65, then the error can be corrected. The dirty cache line stores a SECDED code for the dirty line. The SECDED code can be used by an error corrector to locate and correct the 1-bit error, step 67. Program execution can then continue with the corrected line, step 69.

When the non-zero syndrome is for a 2-bit error on a dirty line, step 65, then the error cannot be corrected. An uncorrectable error is signaled, step 66, which may cause the program using the cache line's data to halt.

When the non-zero syndrome is for a clean line, step 64, then the error can be corrected by re-fetching the cache line from main memory. The current cache line is invalidated and a new line read from memory and written to the data field of the cache line, step 68. A new ECC is also generated and stored for the new line. The new cache line is then validated. Alternately, other cache operations to this line could be delayed while the line is refetched without invalidating an re-validating the cache line.

Program execution continues with the refetched line, step 69. Any length of detected error can be corrected by refetching the clean cache line.

Figure 6:
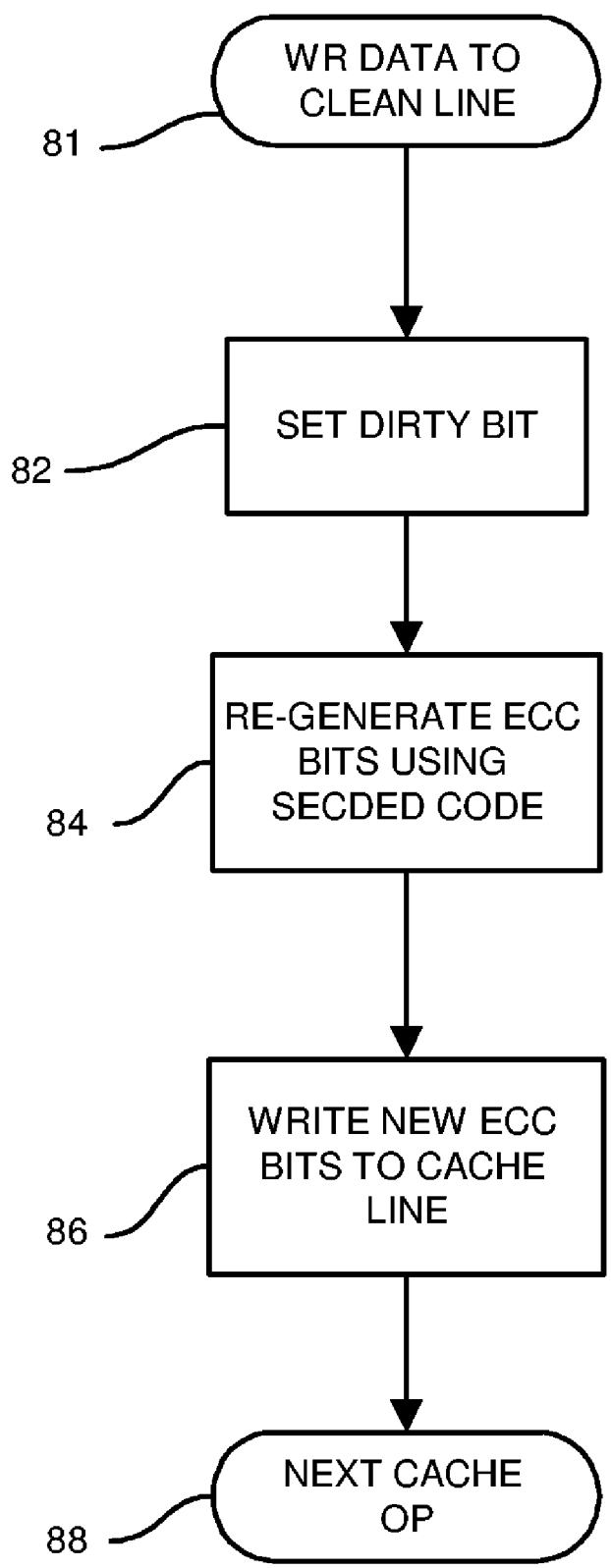
FIG. 6 is a flowchart of writing data to a clean line.

FIG. 6 is a flowchart of writing data to a clean line. When the processor writes data to a clean line, step 81, process 80 is performed. The cache line with the matching tag has its dirty bit set, step 82, or the state bits change to a dirty state. Since dirty lines use a different error code than clean lines, the ECC stored for the line in ECC field 24 is not meaningful for the dirty line. Also, the data in the dirty line has been modified, so a new ECC is generated, step 84. The SECDED code is used for dirty lines rather than the TED code for clean lines.

The newly generated ECC bits are written into ECC field 24, step 86, and stored with the modified data. The next cache operation can now be performed, step 88.

Figure 7:
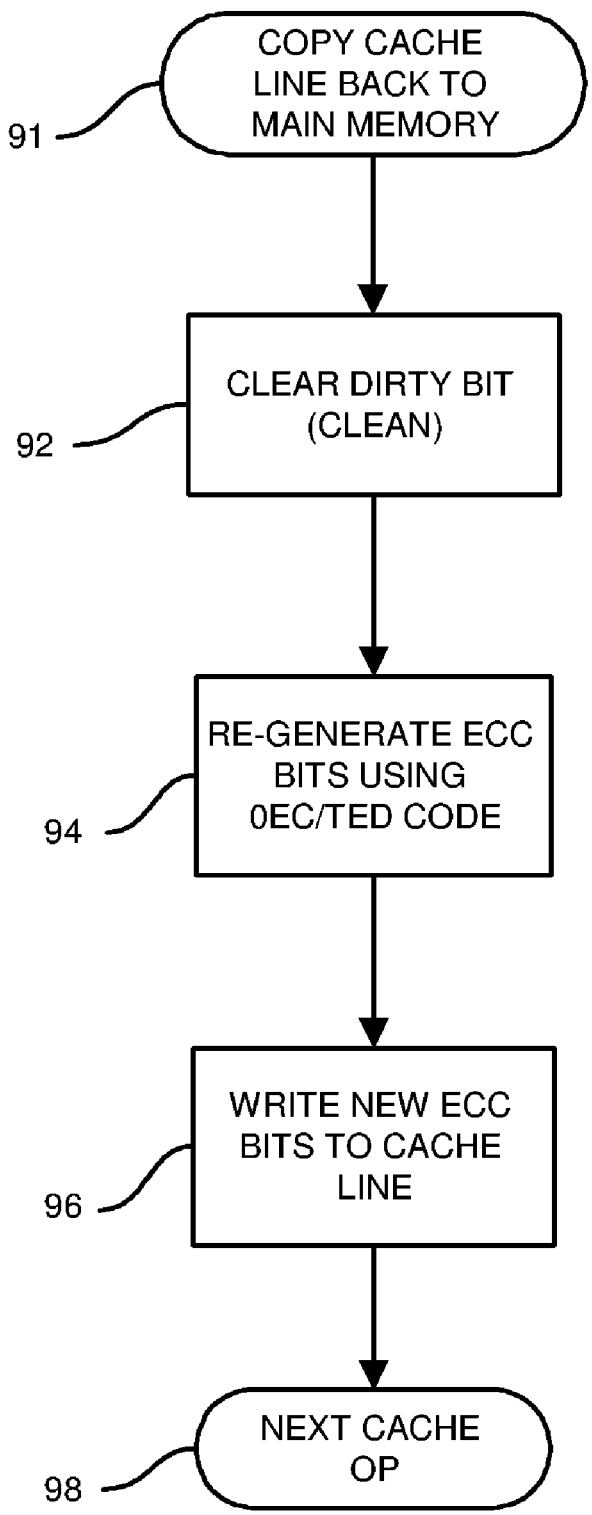
FIG. 7 is a flowchart of copying data back to memory from a dirty line.

FIG. 7 is a flowchart of copying data back to memory from a dirty line. Some time after the processor writes data to a now dirty cache line, the line is written back to memory using process 90. This may occur when the dirty cache line is evicted from the write-back cache when a new line is stored to the same cache location, or after a period of time such as when a cache is flushed or otherwise managed.

The dirty cache line is written to memory, perhaps first being stored in a write buffer, step 91. The cache line has its dirty bit cleared, step 92, or the state bits change to a clean state. The new data is written into the cache line's data field 22. A new ECC is generated, step 94. The TED code for clean lines is used rather than the SECDED code for dirty lines.

The newly generated ECC bits are written into ECC field 24, step 96, and stored with the modified data. The cache line's valid bit may be set. The next cache operation can now be performed, step 98.

FIG. 8 is a flowchart of error processing for clean and dirty lines with a same error coding. Rather than have 2 different error codes for clean and dirty lines, the same code could be used for both clean and dirty lines. For example, a SECDED code could be used.

When an error is detected by the syndrome generated from the data and ECC code, error processing 60 is activated. When the non-zero syndrome is for a 1-bit error, step 51, then the error can be corrected. The cache line stores a SECDED code for the clean or dirty line. The SECDED code can be used by an error corrector to locate and correct the 1-bit error, step 52. Program execution can then continue with the corrected line, step 59.

When the non-zero syndrome is for a 2-bit error, step 51, correction can occur only for clean lines and not for dirty lines, since dirty lines cannot be refetched. When the cache line is dirty, step 54, then an uncorrectable error is signaled, step 56, which may cause the program using the cache line's data to halt.

When the non-zero syndrome is for a clean line, step 54, then the error can be corrected by re-fetching the cache line from main memory. The current cache line is invalidated and a new line read from memory and written to the data field of the cache line, step 58. A new ECC is also generated and stored for the new line. The new cache line is then validated. Alternately, other cache operations to this line could be delayed while the line is refetched without invalidating an re-validating the cache line.

Program execution continues with the refetched line, step 59. Any length of detected error can be corrected by refetching the clean cache line.

Using the same ECC code for clean and dirty lines is less desirable than using different codes, since error detecting ability on clean lines is reduced. For example, using the same SECDED code for clean and dirty lines allows only 2-bit errors to be detected, while 3-bit errors may be undetected. Using a different TED code for clean lines allows 3-bit errors to be detected for clean lines. These 3-bit errors are corrected by refetching the clean line.

FIGS. 9A-B shows results of errors on clean and dirty lines. In FIG. 9A, the prior art can correct 1-bit errors, which allows program execution to continue as if no error occurred. However detecting a 2-bit error causes a program exception, which may halt execution of the program or even halt or crash the system. The 2-bit error halts execution regardless of the cache-line state, clean or dirty.

In FIG. 9B, having separate error detection codes for clean and dirty lines allows for detection of 2-bit and 1-bit errors in clean lines when a TED code is used. Although the TED code cannot correct errors, the cache line can be re-fetched from memory, replacing the faulty cache line. After re-fetching, the clean cache line contains good data, just as if no error was detected.

Dirty cache lines store a different ECC, a SECDED code. Single-bit errors in the dirty cache line are corrected by the SEC code, allowing program execution to continue with the corrected data as good data was in the cache. Double-bit errors are still uncorrectable, usually causing the program to halt execution.

Comparing FIGS. 9A and 9B, clean lines with 2-bit errors do not cause the program to halt as in the prior art. Also, using a TED code allows 3-bit errors to be detected that were not detected in the prior art. These 3-bit errors also cause the clean cache line to be refetched, so the 3-bit errors do not cause a program halt either.

Thus the invention, in some embodiments, allows clean lines to be refetched while still providing correction for dirty lines. Since half of the lines in a write-back cache may be clean at any time, the invention provides better overall error detection and correction by using different codes for clean and dirty lines. Even if the same ECC code were used for both clean and dirty lines, re-fetching clean lines would improve reliability of a write-back cache.

Figure 10:
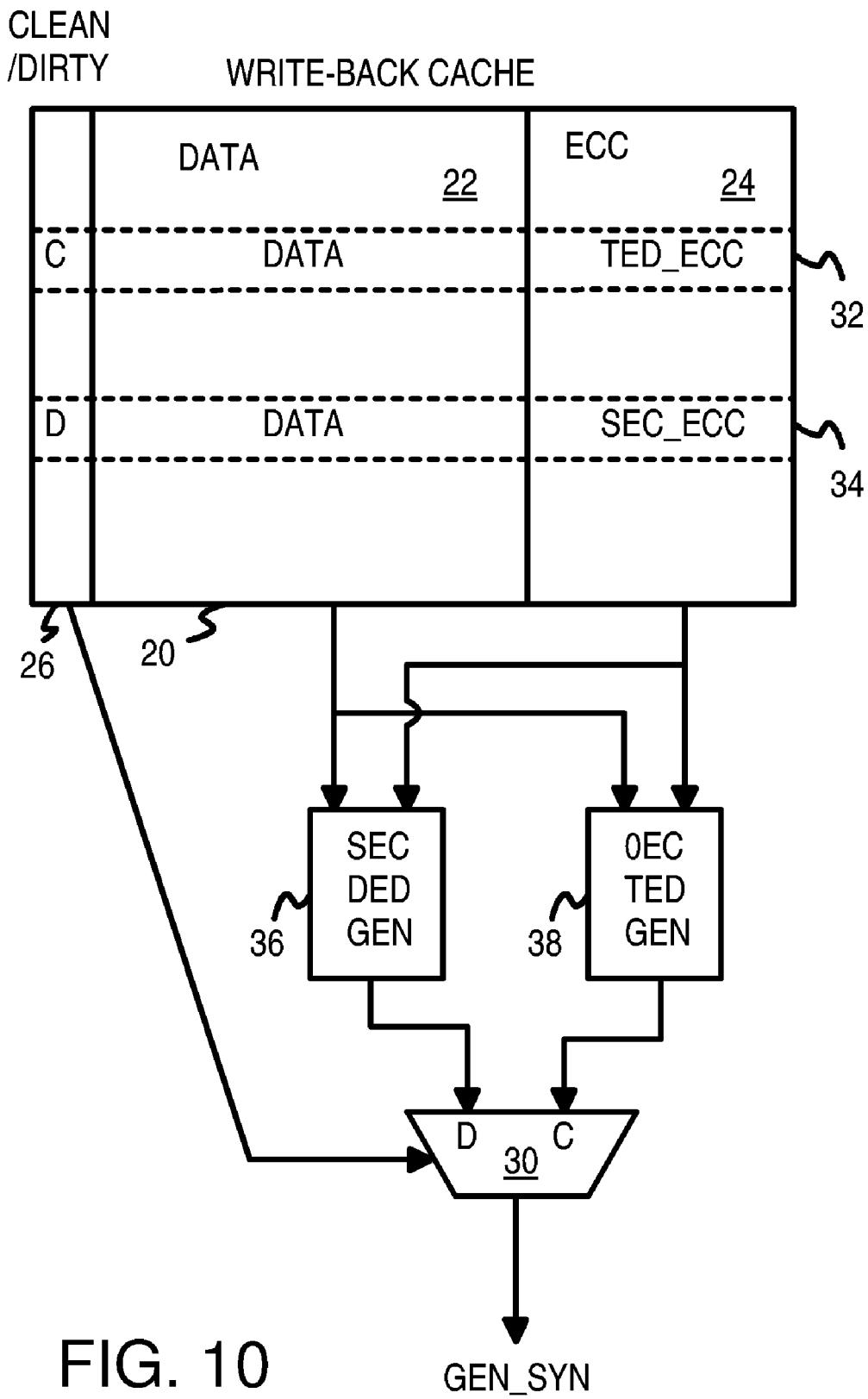
FIG. 10 shows a write-back cache that selects the syndrome generated for different ECC codes using the dirty bit.

FIG. 10 shows a write-back cache that selects the syndrome generated for different ECC codes using the dirty bit. Rather than store a separate bit or bits for code type field 28 as shown in FIG. 3, the dirty bit can be used. Thus code type field 28 does not have to be stored in write-back cache 20.

Instead, the dirty bit from dirty bit field 26 is applied to the control input of mux 30, selecting the SEC-generated syndrome from SEC syndrome generator 36 when the dirty bit is 1, but selecting the TED-generated syndrome from TED syndrome generator 38 when the dirty bit is 0. When dirty bit field 26 is a multi-bit field of more complex cache states, some of the states can be mapped as dirty states while other states are mapped as clean states, and a decoder may be needed to decode a multi-bit cache state stored in dirty bit field 26 into a dirty-clean bit indicator for use by mux 30.

When clean cache line 32 is read from write-back cache 20, data from data field 22 and the error-detect code from ECC field 24 are read and input to TED syndrome generator 38. TED syndrome generator 38 combines the data and ECC bits to generate a syndrome, which is created by a linear block code that takes the data and ECC bits as inputs for generating the different bits in the syndrome. The algorithm used by TED syndrome generator 38 is for an error-detect code that can detect 3-bit errors but cannot correct errors, a OEC/TED code.

The dirty bit from dirty bit field 26 is sent from clean cache line 32 to a control input of mux 30. In response to the dirty bit, mux 30 selects its C input for output as the generated syndrome, GEN_SYN. Thus the TED syndrome is output for clean lines.

When dirty cache line 34 is read from write-back cache 20, data from data field 22 and the error-detect code from ECC field 24 are read and input to SEC syndrome generator 36. SEC syndrome generator 36 combines the data and ECC bits to generate a syndrome. However, the algorithm used is different than for TED syndrome generator 38. The algorithm used by SEC syndrome generator 38 is for an error-correcting and detecting code that can detect only 2-bit errors but can correct errors such as 1-bit errors, a SECDED code.

A dirty bit read from dirty bit field 26 is sent from dirty cache line 34 to a control input of mux 30. In response to the dirty bit, mux 30 selects its D input for output as the generated syndrome, GEN_SYN. Thus the SEC syndrome is output for dirty lines.

When dirty lines are encoded using SECDED, and clean lines are encoded using TED, the dirty bit indicates which ECC code type is used for a cache line. Thus the dirty bit can be used to indicate which syndrome to generate for the data and ECC fields for the cache line, either TED or SECDED.

ALTERNATE EMBODIMENTS

Several other embodiments are contemplated by the inventors. For example many code lengths for ECC fields are possible and the width of data in data field 22 may also vary in various embodiments. The ECC value may be compressed, merged, or combined in various ways prior to storage in ECC field 24. The cache may be direct mapped, set associative, or fully associative, or some other combination. The tags compared to select a cache line may be all the tags for all cache lines for a fully-associative cache, or may be reduced to a set of tags using an index portion of an input address for a set-associative cache, or even to just one tag for a direct-mapped cache. The tags may be stored in a different memory array than the data and error bits, and the error bits also could be stored separate from the data bits or with the data bits. Hard-wired syndrome generators and error checking and correcting logic may be used, or a programmable controller may be used, or some combination. Additionally, the data may be subdivided, and each subdivision may have corresponding ECC check bits.

Dirty bit field 26 may be part of a multi-bit field that also includes a valid bit or other bits. Dirty bit field 26 may store a multi-bit encoded value that must be decoded to determine when the cache line is clean or dirty. Clean and dirty may be supersets of several individual cache states. For example, cache states may include modified (M), owned (O), exclusive (E), shared (S), and invalid (I) states. M and O are dirty states, while E and S are clean states. Other cache states such as exclusive, read-only, read-write, etc. may be encoded with the dirty/clean status. The dirty bit is sometimes known as a modified bit and can be active high or active low. Other cache status and management bits could be stored to indicate ownership of cache lines and the source of the line's data, such as from different processors or memories.

Rather than just store 2 different types of error codes in ECC field 24, three or more types of codes could be stored. These code types could depend on the cache-line state. Exclusive read-only lines might have a different ED code than non-exclusive lines, for example. The code types could also depend on other factors besides cache-line state, such as storing two different TED codes for clean lines from different sources, such as from a local main memory and from an external memory or network.

ECC codes are considered to be different when the same data pattern generates different ECC bits, so that when used with the data, the combined data and ECC bits have different error correcting/detecting properties. An algorithm combines the bits to generate a syndrome. At least some syndrome values are interpreted to have different meanings based on the code design.

While a processor has been described as reading and writing the write-back cache, a wide variety of processors and devices could use the write-back cache. The processor could be a central processing unit (CPU), a co-processor, a network processor, a switch controller, or a microcontroller, and may be programmable or hardwired. Various combinations are possible. The write-back cache could supply data to more than one processor, or to multiple pipelines in a single processor core. The write-back cache could be read-only by one processor or pipeline, and writable by another processor or pipeline.

While zero-value syndromes have been described as indicating no detected errors, other non-zero values could signal no error detection. Multiple syndrome values could indicate absence of errors, or just one value such as zero. Separate syndromes could be generated for portions of data and the syndromes combined or checked individually. These partial syndromes could use some but not all ECC bits.

Although the term ECC has been used to refer to any error-detecting or correcting code, ECC codes that only provide error detection and no error correction are in a strict sense not ECC codes but are only error-detect (ED) codes. However, the term ECC is herein used more broadly to include these ED codes.

While re-fetching cache lines from main memory has been described, some systems have multiple levels of caches. Then the back-up copy may be re-fetched from a lower cache level rather than from main memory. For example, an error detected in a clean level-1 cache may be fetched from a level-2 cache more quickly than from memory or a level-3 cache. Should the cache line be in the level-1 cache but not the level-2 cache, then the line could be fetched from main memory. Some systems may just fetch from main memory at all times for simplicity, while others benefit from faster retrieval times from level-2 caches rather than slower memory.

In some embodiments the processor itself could have a copy of the dirty cache line in a register such as a general-purpose register (GPR) or on a processor cache. However, this internal copy may not be readily available to the memory system without halting the processor or modifying the software executing on the software. Also, the modified data in the processor may be over-written by new data before the external write-back cache could retrieve the processor's data.

The write-back cache could be external to a processor that reads and writes its data, or could be integrated on the same chip with the processor. The write-back cache could be a highest-level cache nearest the processor core, or could be an intermediate level cache or could be the lowest-level cache. Other caches could be in parallel with the write-back cache, at the same level, such as a separate level-1 instruction cache in parallel with a level-1 write-back cache.

Both SEC syndrome generator 36 and TED syndrome generator 38 could be activated for each cache line read as described for FIG. 3, or only one of SEC syndrome generator 36, TED syndrome generator 38 could be activated. A single syndrome generator could be used that had the algorithm selected by the code type or cache-line state, rather than use mux 30.

While SECDED and TED codes have been described, other codes could be used such as linear block codes which detect and correct more bits, or CRC or Reed-Solomon codes. More ECC bits or smaller data words could be used to improve detection and/or correction, such as detecting 3-bit or 4-bit errors, or correcting 2 or more bits in a word.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An error-correcting write-back cache comprising:
a plurality of cache lines, a cache line being selected for access by a cache hit that matches a tag portion of an address input to a store tag for the cache line;
a data field in the cache line for storing data;
an error-code field in the cache line for storing error code for the data in the cache line;
a cache-state field for the cache line, the cache-state field indicating a clean state and a dirty state, wherein the cache line in the clean state has a back-up copy of the data in an external memory, wherein the cache line in the dirty state has no back-up copy of the data in the external memory;
a syndrome generator, receiving the data from the data field and the error code from the error-code field of the cache line selected for access, the syndrome generator generating an error syndrome that indicates a detected error in the data;
an error corrector, coupled to the syndrome generator, the error corrector examining the cache-state field for the cache line to determine when the cache line is in the clean state, the error corrector re-fetching the back-up copy of the cache line from the external memory to replace the data in the data field when the syndrome generator indicates the detected error for a cache line in the clean state;
wherein the error corrector uses the error syndrome generated from the error code to locate and correct an error in the data field when the cache line is in the dirty state;
wherein the error corrector corrects single-bit errors in the data field and signals an uncorrectable error for longer multi-bit errors in the data field,
wherein single-bit errors in dirty cache lines are corrected while longer multi-bit errors are uncorrectable for dirty cache lines but corrected by re-fetching clean cache lines;
wherein the error code for dirty cache lines is a code value in a first error code, the first error code comprising a first set of error encodings of the data field;
wherein the error code for clean cache lines is a code value in a second error code, the second error code comprising a second set of error encodings of the data field,
whereby clean and dirty cache lines use different error codes in different sets of error encodings of the data field and whereby clean cache lines with detected errors are re-fetched from the external memory, and dirty cache lines are error-corrected using the error code.

2. The error-correcting write-back cache of claim 1 wherein the external memory with the back-up copy is a main memory or a lower-level cache.

3. The error-correcting write-back cache of claim 1 wherein the uncorrectable error is signaled only for cache lines in the dirty state and not for cache lines in the clean state, the cache lines in the clean state being corrected by re-fetching the back-up copy of the data from the external memory.

4. The error-correcting write-back cache of claim 3 wherein the uncorrectable error signaled by the error corrector causes an executing program to halt execution;
wherein errors in clean cache lines do not cause the executing program to halt execution,
whereby only dirty cache lines can cause the executing program to halt.

5. The error-correcting write-back cache of claim 1 wherein the cache-state field contains a dirty bit that is set when a processor writes to a cache line in the error-correcting write-back cache.

6. The error-correcting write-back cache of claim 5 wherein the dirty bit in the cache-state field is cleared when the cache line in the dirty state is copied back to the external memory.

7. The error-correcting write-back cache of claim 1 wherein the first set of error encodings and the second set of error encodings have different code values for a same data value in the data field.

8. The error-correcting write-back cache of claim 7 wherein the first set of error encodings comprises an error-correction code (ECC) that is capable of correcting D-bit errors and capable of detecting and not correcting D+1 bit errors, wherein D is a whole number of at least 1;
wherein the second set of error encodings comprises an error-detecting code (ED) that is capable of detecting errors of 1 to C bits in length, wherein C is a whole number of at least 2,
whereby error detecting and correcting capabilities of the error codes for clean and dirty cache lines differ.

9. The error-correcting write-back cache of claim 8 wherein the second set of error encodings comprises an error-detecting code (ED) that is unable to correct any errors including single-bit errors.

10. The error-correcting write-back cache of claim 8 wherein the first set of error encodings comprises a single-error-correction, double-error-detection (SECDED) error-correction code (ECC) that is capable of correcting 1-bit errors and capable of detecting and not correcting 2-bit errors.

11. The error-correcting write-back cache of claim 10 wherein the second set of error encodings comprises a triple-error-detecting code (TED) that is capable of detecting errors of 1, 2, and 3 bits in length.

12. A method for correcting data stored in cache lines in a write-back cache comprising:
finding a selected cache line in a plurality of cache lines by matching a tag portion of an input address with a stored tag for the selected cache line;
examining at least one cache-state bit to determine when the selected cache line is a modified cache line and when the selected cache line is a clean cache line;
when the selected cache line is a modified cache line, generating a first syndrome from data in the selected cache line and from error bits in the selected cache line using a first syndrome algorithm that represents a first error code;
when the selected cache line is a clean cache line, generating a second syndrome from data in the selected cache line and from error bits in the selected cache line using a second syndrome algorithm that represents a second error code;
outputting the first syndrome as an error syndrome when the selected cache line is a modified cache line, and outputting the second syndrome as the error syndrome when the selected cache line is a clean cache line,
examining the error syndrome to determine when an error is detected in the selected cache line;

correcting the error in the data of the selected cache line using the first syndrome or the error bits when the first syndrome indicates that the error is correctable and the selected cache line is a modified cache line;

correcting the error in the data of the selected cache line by re-fetching the data from a memory when the selected cache line is a clean cache line; and signaling an uncorrectable error when the selected cache line is a modified cache line and the first syndrome indicates that the error is correctable;

wherein the error bits are error-correction code (ECC) bits for modified cache lines;

wherein generating the first syndrome from data in the selected cache line and from error bits in the selected cache line using the first syndrome algorithm that represents the first error code comprises generating correcting syndrome values for correctable errors and generating uncorrectable syndrome values for uncorrectable errors;

wherein the correcting syndrome values indicate a location of the error in the data;

wherein the error bits are error-detection code (ED) bits for clean cache lines;

wherein generating the second syndrome from data in the selected cache line and from error bits in the selected cache line using the second syndrome algorithm that represents the second error code comprises generating detected syndrome values that do not indicate the location of the error in the data, whereby the error bits for clean cache lines are error-detection code bits and the error bits for modified cache lines are error-correction code (ECC) bits and whereby clean and dirty cache lines store error bits with error syndromes generated using different syndrome algorithms that represents different error codes.

13. The method of claim 12 wherein examining the error syndrome to determine when an error is detected in the selected cache line comprises detecting when the error syndrome is non-zero.

14. The method of claim 12 further comprising:

correcting the error in the data of the selected cache line using the second syndrome or the error bits when the second syndrome indicates that the error is correctable and the selected cache line is a clean cache line;

correcting the error in the data of the selected cache line by re-fetching the data from the memory when the selected cache line is a clean cache line and the second syndrome indicates that the error is uncorrectable, whereby errors in clean cache lines are corrected by the second syndrome or the error bits or are corrected by re-fetching from the memory.

15. A write-back cache comprising:

a plurality of cache lines including a selected cache line that is selected by a matching tag;

data field means for storing data bits associated with the selected cache line;

error field means for storing error bits that enable detecting and/or correcting errors in the data field means;

dirty bit field means for storing at least one cache-line-state indicator bit, the dirty bit field means indicating when the selected cache line is a clean cache line and when the selected cache line is a dirty cache line;

syndrome generator means, receiving the data bits and the error bits from the selected cache line, for generating an error syndrome that indicates presence of an error in the data bits;

wherein the syndrome generator means generates the error syndrome using a first procedure determined by a first encoding when the dirty bit field means indicates that the selected cache line is the dirty cache line;

wherein the syndrome generator means generates the error syndrome using a second procedure determined by a second encoding when the dirty bit field means indicates that the selected cache line is the clean cache line;

refetch means for refetching data bits from a back-up memory to restore the data bits in the data field means when the error syndrome indicates the error and the dirty bit field means indicates that the selected cache line is the clean cache line;

correction means for correcting the error in the data bits using the error bits when the error syndrome indicates the error and the dirty bit field means indicates that the selected cache line is the dirty cache line; and clean correction means for correcting the error in the data bits using the error bits when the error syndrome indicates the error and the dirty bit field means indicates that the selected cache line is the clean cache line;

wherein when the error syndrome indicates that the error is less than L bits in length, the clean correction means is activated, but when the error syndrome indicates that the error is L bits or more in length, the refetch means is activated;

wherein L is a whole number;

whereby clean cache lines are corrected by refetching or by correcting using the error bits and whereby dirty cache lines are corrected from the error bits and clean cache lines are refetched.

16. The write-back cache of claim 15 wherein the first encoding and the second encoding represent different error-correction or error-detection codes;

wherein the first encoding enables the syndrome generator means to generate error syndromes that indicate correctable errors and error syndromes that indicate uncorrectable errors of D bits, wherein D is a whole number of at least 2;

wherein the second encoding enables the syndrome generator means to generate error syndromes that indicate that indicate uncorrectable errors of D+1 bits;

wherein the first encoding does not enable the syndrome generator means to generate error syndromes that indicate uncorrectable errors of D+1 bits, wherein the second encoding for clean cache lines has greater error-detection capability than the first encoding for dirty cache lines.

* * * * *